UNITED STATES PATENT OFFICE.

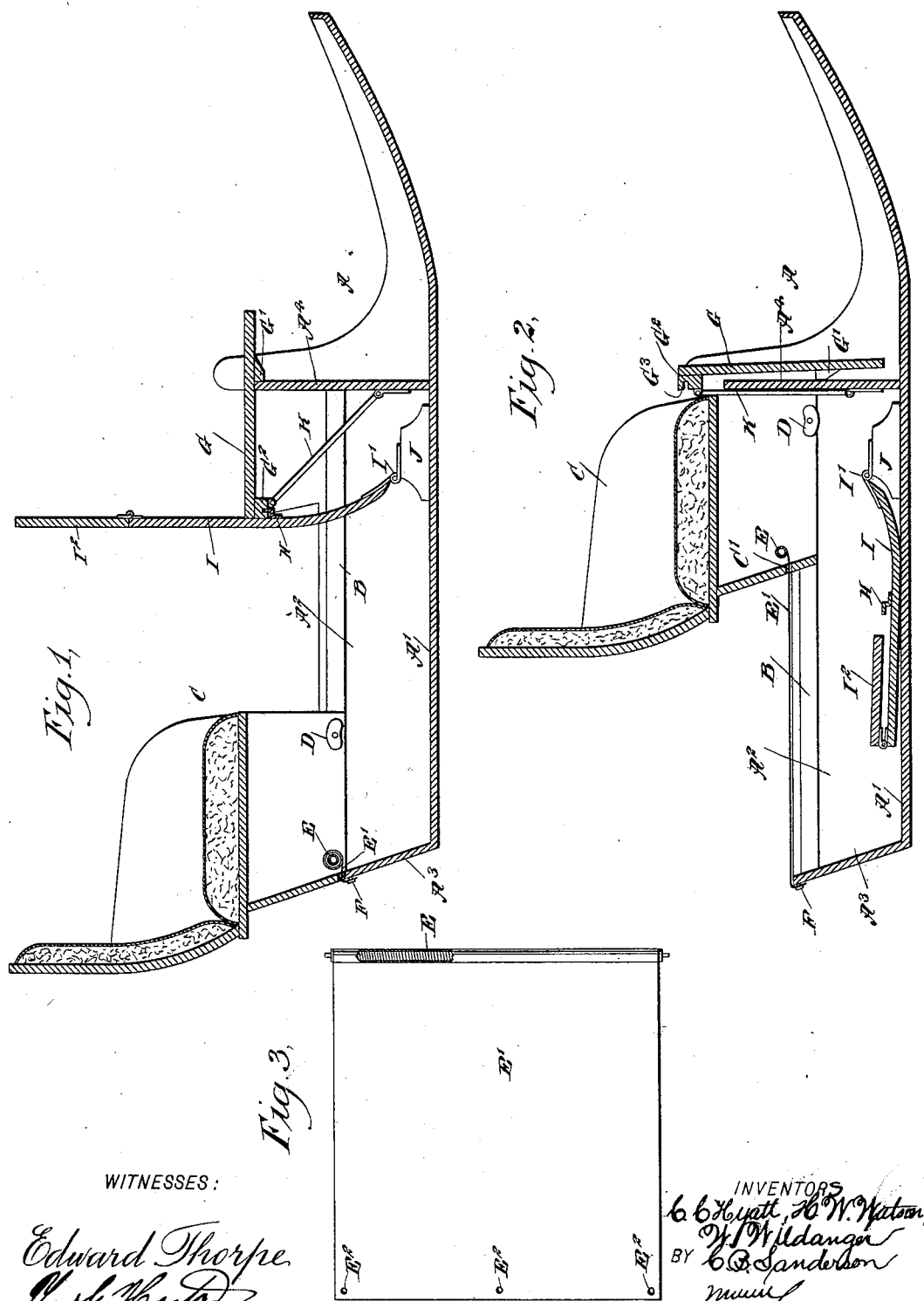

CLARK C. HYATT, HARRY W. WATSON, WILLIAM WILDANGER, AND CYRUS B. SANDERSON, OF FLINT, MICHIGAN.

VEHICLE.

SPECIFICATION forming part of Letters Patent No. 653,511, dated July 10, 1900.

Application filed October 31, 1899. Serial No. 735,366. (No model.)

*To all whom it may concern:*

Be it known that we, CLARK C. HYATT, HARRY W. WATSON, WILLIAM WILDANGER, and CYRUS B. SANDERSON, citizens of the United States, and residents of Flint, in the county of Genesee and State of Michigan, have invented a new and Improved Vehicle, of which the following is a full, clear, and exact description.
The invention relates to bodies for cutters, sleighs, and like vehicles; and the object is to provide a new and improved vehicle-body arranged to permit of conveniently and quickly changing the vehicle from a single-seated one to a double-seated one, or vice versa, and to protect the rear portion of the body from dust in case only a single seat is used.

The invention consists of novel features and parts and combinations of the same, as will be fully described hereinafter and then pointed out in the claims.

A practical embodiment of our invention is represented in the accompanying drawings, forming a part of this specification, in which similar characters of reference indicate corresponding parts in all the views.

Figure 1 is a longitudinal sectional side elevation of the improvement as arranged with two seats. Fig. 2 is a similar view of the same arranged with one seat; and Fig. 3 is a plan view, with part in section, of the dust-protector for the vehicle body or box.

The vehicle-body A, as shown in Figs. 1 and 2, is provided with the usual bottom A', the side rails A², the rear end A³, and the vertically-disposed front end A⁴. On the side rails A² are arranged longitudinally-extending guideways B, on which is mounted to slide the rear seat C, adapted to be fastened in either a rearward or forward position by a suitable fastening device, such as an eccentric D indicated in the drawings. When the rear seat C is in a rearmost position, as shown in Fig. 1, then room is left in the forward portion of the body for a second seat, constructed as hereinafter more fully described, said second seat being made in knockdown parts or sections to readily move this forward seat out of position and bring the rear seat C into a forward position, as shown in Fig. 2, when it is desired to use the vehicle single-seated.

In the sides of the seat C and at the lower portion thereof is journaled a spring-roller E, on which is fastened one end of an apron E', extending rearwardly through an opening C' in the seat, the other or outer end of said apron being formed with eyelets E², adapted to button on buttons F, secured to the rear end A² of the vehicle-body. When the seat C is in a rearmost position, the apron E' is almost completely wound up on the spring-roller E; but when the seat C is moved forward into the position shown in Fig. 2 then the apron E' is unwound from the roller E as the latter moves forward with the seat, and said apron E' is now stretched over the rear portion of the vehicle-body A, so as to form a dust and dirt protector for the body. When the seat C is again moved into a rearmost position, the apron E' automatically winds up on its spring-roller E.

The front seat is provided with a seat proper, G, formed at the under side, near the front end thereof, with a transversely-extending cleat or lug G', adapted to abut against the outer face of the front end A⁴, said seat resting on the top edge of said front end. The rear end of the seat G is provided at the under side with a transversely-extending cleat G², formed with a transverse recess G³, adapted to be moved upon a hook H, secured to a back I for the front seat, said back being hinged at I' to a block J, secured to the bottom A' of the vehicle-body in the rear of the front end A⁴. The upper end of the back I is preferably provided with a hinged extension I², as shown. The cleat or lug G² is pivotally connected by a brace K with the front end A⁴ of the vehicle-body, so that when the seat G is moved upon the hook H a very firm seat is provided, as indicated in Fig. 1.

When it is desired to change the vehicle to a single-seated one, as indicated in Fig 2, the operator unhooks the seat G from the hook H and then slides the seat forward, so that the seat finally drops in front of the end A⁴, while the back I swings downward into the vehicle-body and rests on the bottom A' thereof, the extension I² being folded upon said back I, as shown in Fig. 2. The seat C can now be moved forward, as above mentioned, to occupy the place previously occupied by the front seat G, now in a knocked-down condition.

It is understood that the end A⁴ of the vehicle-body forms a leg for the front end of the seat G, while the lower portion of the back I forms an additional leg for said seat to properly hold the same in position when the several parts are extended, as is plainly indicated in Fig. 1. It will also be seen that the seat G has a double-hinge connection by the brace K with the fixed leg or end A⁴, to connect the seat with the said end whether it is in an extended or in a folded position.

Having thus fully described our invention, we claim as new and desire to secure by Letters Patent—

1. A vehicle-body having a fixed seat-leg, a seat adapted to rest at one end on said leg, a brace pivotally connecting the seat with the leg, and a back hinged to the body and arranged for removable connection with the end of the seat at the brace connection, substantially as shown and described.

2. A vehicle-body, a main or rear seat movable longitudinally thereof, and a front knock-down seat comprising a seat proper adapted to rest with its forward end on a fixed part of the vehicle-body, a back hinged to the vehicle-body and movably connected with said seat, and a brace extending from the seat to the vehicle-body at or near the connection of the seat with said back, substantially as shown and described.

3. The combination of a fixed seat-leg, a seat adapted to rest at one edge portion on said leg, and a folding seat-back mounted adjacent to the seat-leg and having means for removably engaging the seat at the edge portion opposite the leg to support the seat.

4. The combination of a fixed seat-leg, a seat, a swinging brace hinged to the seat, the seat being capable of swinging over the seat-leg to bear one edge portion thereon, and a folding seat-back having means for removably engaging the seat at the edge portion opposite the seat-leg to support the seat.

CLARK C. HYATT.
HARRY W. WATSON.
WILLIAM WILDANGER.
CYRUS B. SANDERSON.

Witnesses:
MARION T. HYATT,
FRANK R. STUAT.